United States Patent [19]
Oshima

[11] Patent Number: 5,923,773
[45] Date of Patent: Jul. 13, 1999

[54] MEASURED VALUE PROCESSING METHOD, A SHAPE RECONSTRUCTING METHOD, AND A SHAPE RECONSTRUCTING APPARATUS

[75] Inventor: Mitsuo Oshima, Tokyo, Japan

[73] Assignee: Oki Electric Industry Co., Ltd., Tokyo, Japan

[21] Appl. No.: 08/816,523

[22] Filed: Mar. 13, 1997

[30] Foreign Application Priority Data

Aug. 15, 1996 [JP] Japan ..................................... 8/215648

[51] Int. Cl.$^6$ ....................................... G06K 9/00
[52] U.S. Cl. ............................ 382/154; 382/254; 356/12
[58] Field of Search .................................. 382/156, 106, 382/254; 356/11, 12; 702/150

[56] References Cited

U.S. PATENT DOCUMENTS

| | | | |
|---|---|---|---|
| 5,606,627 | 2/1997 | Kuo ......................................... | 382/154 |
| 5,680,474 | 10/1997 | Iijima et al. ............................. | 382/154 |

OTHER PUBLICATIONS

"Reconstruction of 3D Oreintation of Skin Surface Replicas by Expanding Photometric Stereo", The Transactions of the Institute of Electronics, Information, and Communication Engineers of Japan, Part D–II, vol. J77–D–II, No. 9, pp. 1797–1805, Sep. 1994.

"Photometric Stereo by Simultaneous Illumination with Three Colored Lights", The Transactions of the Institute of Electronics, Information, and Communication Engineers of Japan, Part D–II, vol. J76–D–II, No. 10, pp. 2243–2246, Oct. 1993.

"Recovery of Curved Surfaces from Stereo of Isoluminance Contours", The Transactions of the Institute of Electronics, Information, and Communication Engineers of Japan, Pat D–II, vol. J77–D–II, No. 9, pp. 1673–1679, Sep. 1994.

"Binocular Shading and Visual Surface Reconstruction", Computer vision, Graphics, and Image Processing 28, pp. 19–43 (1984).

"Shape from Interreflections" IEEE, 1990, pp. 2–11.

"Reconstruction of Curved Surface Using Isodensity Maps Based on Stereo Vision System", SPIE vol. 2249, Automated 3D and 2D Vision (1994) pp. 243–253.

*Primary Examiner*—Amelia Au
*Assistant Examiner*—Vikkram Bali
*Attorney, Agent, or Firm*—Rabin & Champagne P.C.

[57] ABSTRACT

A method for making it possible to simply reduce accumulation of integral errors when obtaining a directing measured result by integrating measured values in a measured value group. Integrated values Ye(i) up to each measured value are obtained by means of the partial integrating method by using the even-numberth measured values in a measured value group as the respective reference values, respectively. Integrated values Yo(i) up to each measured value are obtained by means of the partial integrating method by using the odd-numberth measured values in a measured value group as the respective reference values, respectively. An average value of Ye(i) and one of the odd-numberth-reference integrated values Yo(i−1), Yo(i), and Yo(i+1) is taken as a final integrated result Y(i) up to each measured value, where i is a place number in a row of measured values.

14 Claims, 9 Drawing Sheets

Left gradational image

Right gradational image

Information inside
the parallax storing means

MEASURED VALUE PROCESSING METHOD, A SHAPE RECONSTRUCTING METHOD, AND A SHAPE RECONSTRUCTING APPARATUS

BACKGROUND OF THE INVENTION

1. Field of the Invention

The present invention relates to a method of processing a measured value, and more particularly, to a method for obtaining a directing measured result by integrating a number of measured values, for example, image information in pixel units handled in an image processing or voice information in time series handled in an voice processing. This invention further relates to a shape reconstructing method using said method, and an apparatus suitable for implementing said shape reconstructing method.

2. Description of the Related Art

As an example of a method for detecting surface inclinations of a subject in pixel units and reconstructing a shape of the subject by integrating the detected inclinations, there is a method disclosed in reference I "THE TRANSACTIONS OF THE INSTITUTE OF ELECTRONICS, INFORMATION, AND COMMUNICATION ENGINEERS OF JAPAN, PART D-II VOL. J77-D-II NO.9 pp.1797 to 1805, SEPTEMBER 1994". This method obtains plural images of a subject by photographing said subject from a fixed position as changing only the direction of a light source. Next, it detects surface inclinations of said subject in pixel units from pairs of luminances on arbitrary pixels corresponding to each other in these images. And it reconstructs a shape by integrating the detected inclinations (see "lines 1 to 9 in the left column of pp.1798 of the reference I"). When performing this integration, it is necessary to determine integral intervals. This is for the purpose of distinguishing an object to be photographed in a subject from its background.

As a method for determining an integral interval, there have been up to now (a) a method of separating an integral interval from an image by means of a two-level processing or the like (see "Line 5 from the bottom of pp.1799 of the reference I") and (b) a method of identifying an integral interval by comparing a subject with a reference object on the basis of a reflectivity map and estimating a domain different in reflectivity on the basis of an estimated error value of a pixel normal vector (see "Line 4 of pp.1799 to line 1 of pp.1800 of the reference I").

And for performing the integration, a method has been adopted (1) which uses the brightest point in an image as an initial value for the integration (see "Lines 9 and 10 of pp.1800 of reference I") or (2) which performs integration after obtaining an integration starting point to minimize an error of an initial inclination value (see reference II "THE TRANSACTIONS OF THE INSTITUTE OF ELECTRONICS, INFORMATION, AND COMMUNICATION ENGINEERS OF JAPAN, PART D-II VOL. J76-D-II NO.10, line 28 or later in the left column of pp.2244).

And in order to suppress accumulation of integral errors, a method is also adopted which computes average values of depth as weighting with estimated errors (see "Lines 19 and 20 in the left column of pp.1800 of reference I").

And in order to reduce an integral error, a method is also adopted which selects an integral path (see "Line 3 or later from the bottom of the left column of pp.2244 of reference II").

However, the prior art adopts a method of simply integrating inclinations on pixels as integration itself. Therefore, since noises and quantizing errors are accumulated, there has been a disadvantage that an integral error is liable to become great. Concretely, for example, in an existing method, single-shot noises or quantizing noises often caused by photographing a subject by means of a CCD (charge coupled device) camera or the like are accumulated as an integral error.

In case of adopting a method of weighting with estimated errors in order to suppress accumulation of integral errors, if estimation of errors is wrong, an integrated value is distorted by the errors, and since an amount of suppression varies with a quantity of estimated errors, an integrated value is distorted by the variation in suppression.

In case of adopting a method of selecting an integral path in order to reduce integral errors, it is not easy to select a proper integral path and integrated values are made different depending upon the selected paths.

One object of the present invention is to provide a measured value processing method capable of easily reducing accumulation of integral errors without performing such a human work as an error estimation and an integral path selection.

Another object of the present invention is to provide a shape reconstructing method and an apparatus using this processing method.

A further object of the present invention is to provide an apparatus for implementing the shape reconstructing method.

SUMMARY OF THE INVENTION

There is provided, according to a first aspect of the present invention, a measured value processing method for obtaining a directing measured result by integrating measured values in a measured value group. The measured value processing method obtains an integrated value $Ye(i)$ (called an even-numberth-reference integrated value) up to each measured value by means of the following processes (a) to (c) as using the even-numberth measured values in the measured value group as the respective reference values. And it obtains an integrated value $Yo(i)$ (called an odd-numberth-reference integrated value) up to each measured value by means of the following processes (a) to (c) as using the odd-numberth measured values in the measured value group as the respective reference values. And it takes an average value of the even-numberth-reference integrated value $Ye(i)$ and one of the odd-numberth-reference integrated values $Yo(i-1)$, $Yo(i)$, and $Yo(i+1)$ as a final integrated result $Y(i)$ up to each measured value, where i is a place number in a row of measured values.

(a) A process or obtaining a difference between the reference measured value and a measured value adjacent to it, obtaining a partial integral element by multiplying the difference by a specified factor, and accumulating the partial integral element on a partial integral element obtained before it, (b) A process of multiplying the reference measured value by the specified factor, subtracting the accumulated partial integral element from this multiplied result, and taking the subtracted result as an integrated value up to the reference measured value.

(c) A process of obtaining integrated values up to the respective reference measured values by applying the processes (a) and (b) to the reference measured values, and complementing an integrated value up to a measured value adjacent to the reference measured value with an integrated value obtained by applying the processes (a) and (b) to the reference measured value.

In the invention, a specified factor may be a value represented typically by an integrated consecutive values count, namely, n, n−1, or the like described later (the number of measured values used in integration up to that value). However, the specified factor may be a number near the integrated consecutive values count, depending upon an acceptable accumulation of integral errors. The first term and the second term of the partial integration may have different factors to each other, depending upon an acceptable integrated value.

According to this measured value processing method, the following effects can be obtained. First, a multiplied result obtained by multiplying a reference measured value by a specified factor originally does not have integral errors accumulated as clearly known from the principle of computation for it. On the other hand, since an accumulated partial integral element is obtained by adding differences between measured values adjacent to each other by the number of integrated consecutive values, they originally have integral errors accumulated.

However, according to this invention, measured values in a measured value group are integrated as using the even-numberth measured values as the respective reference values and using the odd-numberth measured values as the respective reference values. Accordingly, integration of differences between the even-numberth measured values and the odd-numberth measured values and integration of differences between the odd-numberth measured values and the even-numberth measured values are separately performed as integration of differences between measured values adjacent to each other. In case that integrations are separately performed in this way, for example when a measured value is a measured value on which a single-shot noise is superposed, this single-shot noise is, for example, integrated as a positive noise in integration using an odd-numberth measured value as a reference value, while this single-shot noise is integrated as a negative noise in integration using an even-numberth measured value as a reference value.

And according to this invention, a final integrated value is taken as an average of an integrated value using an even-numberth measured value as a reference value and an integrated value using an odd-numberth measured value as a reference value. The positive noise and the negative noise cancel each other by taking an average in this way. Accordingly, a single-shot noise can be removed without performing such a human work as an error estimation or an integral path selection.

In case of implementing the invention of this measured value processing method, it is preferable to do in the following, namely, to add a process of judging whether measured values between which the difference is taken have the same sign as each other or different signs from each other. When processing a measured value, in case that the measured values are judged to have different signs from each other, this measured value processing method resets the specified factor and the accumulated value of partial integral elements, and stores an even-numberth-standard integrated value and an odd-numberth-standard integrated value respectively as basic values Ve and Vo, and then applies the processes (a) to (c) to measured values on and after the applicable measured value. Furthermore, this method takes a value (Ve+Ye[i]) obtained by adding the stored basic value Ve to an even-numberth-standard integrated value obtained in the processes (a) to (c) as the applicable even-numberth-standard integrated value, and takes a value (Vo+Yo[i]) obtained by adding the stored basic value Vo to an odd-numberth-standard integrated value obtained in the processes (a) to (c) as the applicable odd-numberth-standard integrated value. According to this preferable example, since measured values can be integrated even in case that they extend from plus to minus, an application range of the invention is extended.

According to a second aspect of the invention, there is provided a shape reconstructing method for detecting surface inclinations of a subject in pixel units and reconstructing a shape of the subject by integrating the inclinations. The shape reconstructing method comprises the steps;

obtaining an integrated value Ye(i) (even-numberth-reference integrated value) of inclinations up to each pixel by means of the following processes (a) to (c) as using inclinations detected on the even-numberth pixels as the respective reference inclinations, obtaining an integrated value Yo(i) (odd-numberth-reference integrated value) of inclinations up to each pixel by means of the following processes (a) to (c) as using inclinations detected on the odd-numberth pixels as the respective reference inclinations, and taking an average value of the even-numberth-reference integrated value Ye(i) and one of the odd-numberth-reference integrated values Yo(i−1), Yo(i), and Yo(i+1) as a final integrated result Y(i) up to each measured value, where;

i is a place number in a row of pixels, and the following processes (a) to (c) are;

(a) a process of obtaining a difference between an inclination on the reference pixel and an inclination on a pixel adjacent to it, obtaining a partial integral element by multiplying the difference by a specified factor, and accumulating the partial integral element on a partial integral element obtained before it, (b) a process of multiplying an inclination on the reference pixel by the specified factor, substracting the accumulated partial integral element from this multiplied result, and taking the subtracted result as an integrated value up to the reference pixel, and (c) a process of obtaining integrated values up to the respective reference pixels by applying the processes (a) and (b) to the reference pixels, and complementing an integrated value up to a pixel adjacent to the reference pixel with an integrated value obtained by applying the processes (a) and (b) to the reference pixel.

Since an effect of the measured value processing method appears when integrating inclinations in pixel units, a shape reconstructing method highly resistant to single-shot noises, quantizing noises, and the like can be implemented.

In case of implementing the invention of the shape reconstructing method, it is preferable to photograph a subject from at least two different positions, obtain in pixel units parallaxes on the subject between these positions, and perform the integration of a pixel group as one integral interval in which the pixels have parallaxes within a specified range. By doing this, an integral interval can be determined without performing a two-level processing. And since one end of a row of pixels having parallaxes within a specified range becomes an integration starting point as it is, this method dispenses with detection of the brightest point or computation of an integration starting point as required up to now. The thought of determining an integral interval on the basis of parallaxes is based on the following thought. Generally, objects to be reconstructed in shape often exist dispersedly in the distance direction (typically in the direction along D in FIG. 4). Furthermore, an object often stays within a certain range of distance in the distance direction. In this case, that an object stays within a certain range of distance in the distance direction means that parallaxes obtained by photographing an object, for example, by means of a twin-lens stereoscopic imaging method stay also within a certain range. Reversely speaking, a pixel group having parallaxes in a specified range in images obtained by photographing a subject for example by means of a twin-lens stereoscopic imaging method can be thought to be a pixel group obtained by photographing one object, and therefore, this pixel group may be considered as one integral interval. Pixels having a parallax within a specified range in this case include not only pixels being 5 in parallax or pixels being 8 in parallax but also pixels being in parallax within a range of 3 to 5 or pixels being in parallax within a range of 6 to 8.

Moreover, in case of implementing the invention of the shape reconstructing method, it is preferable that a subject is photographed from at least two different positions and each of the inclinations in pixel units is detected on the basis of a subject luminance ratio of pixels corresponding to the same position on the subject in the respective images obtained from the different positions. The reason is that in case of obtaining surface inclinations of a subject by means of an existing method disclosed in reference I for example, such a problem happens that since plural lighting directions are required for the subject, it is necessary to prepare a reflectivity map after limiting a light source and a material for the subject, that the subject is limited, or that composition of a detecting apparatus is complicated. However, this preferable example can avoid such a problem.

Furthermore, this preferable example has also an advantage that an inclination can be detected by utilizing a means for obtaining a parallax and an image obtained at that time as they are.

And according to a third aspect of the invention, there is provided a shape reconstructing apparatus which is provided with an inclination detecting means for detecting inclinations of a subject in pixel units and reconstructs a shape of the subject by integrating the detected inclinations.

The shape reconstructing apparatus comprises;

an even-numberth-reference integrated value computing means for obtaining an integrated value Ye(i) (even-numberth-reference integrated value) of inclinations up to each pixel by means of the following processes (a) to (c) by using inclinations on the even-numberth pixels as the respective reference inclinations, an odd-numberth-reference integrated value computing means for obtaining an integrated value Yo(i) (odd-numberth-reference integrated value) of inclinations up to each pixel by means of the following processes (a) to (c) by using inclinations on the odd-numberth pixels as the respective reference inclinations, and a final integrated value computing means for taking an average value of the even-numberth-reference integrated value Ye(i) and one of the odd-numberth-reference integrated values Yo(i−1), Yo(i), and Yo(i+1) as a final integrated result Y(i) up to each measured value; where i is a place number in a row of pixels), and the following processes (a) to (c) are;

(a) a process of obtaining a difference between an inclination on the reference pixel and an inclination on a pixel adjacent to it, obtaining a partial integral element by multiplying the difference by a specified factor, and accumulating the partial integral element on a partial integral element obtained before it.

(b) a process of multiplying an inclination on the reference pixel by the specified factor, substracting the accumulated partial integral element from this multiplied result, and taking the subtracted result as an integrated value up to the reference pixel.

(c) a process of obtaining integrated values up to the respective reference pixels by applying the processes (a) and (b) to the respective reference pixels, and complementing an integrated value up to a pixel adjacent to the reference pixel with an integrated value obtained by applying the processes (a) and (b) to the reference pixel.

According to this shape reconstructing apparatus, since this method has specified means, it can easily implement the above-mentioned shape reconstructing method.

BRIEF DESCRIPTION OF THE DRAWINGS

The foregoing and other objects, features and advantages of the present invention will be better understood from the following description taken in connection with accompanying drawings, in which:

FIG. 3, comprising

FIG. 4, comprising

DESCRIPTION OF THE PREFERRED EMBODIMENTS

With reference to the drawings, detailed description will be given to embodiments of a measured value processing method, a shape reconstructing method, and a shape reconstructing apparatus of the present invention.

In the following explanations, examples in which measured values are inclinations of a subject in pixel units are described. The drawings used in the explanations are only shown so roughly as to understand the invention. And the same numbers are given to the corresponding components in figures and the duplicate explanations are sometimes omitted. In the following embodiments, an example is described where a subject is photographed from two different positions (where a twin-lens stereoscopic detector is used).

1. First Embodiment 1-1. Apparatus

Figure 1:
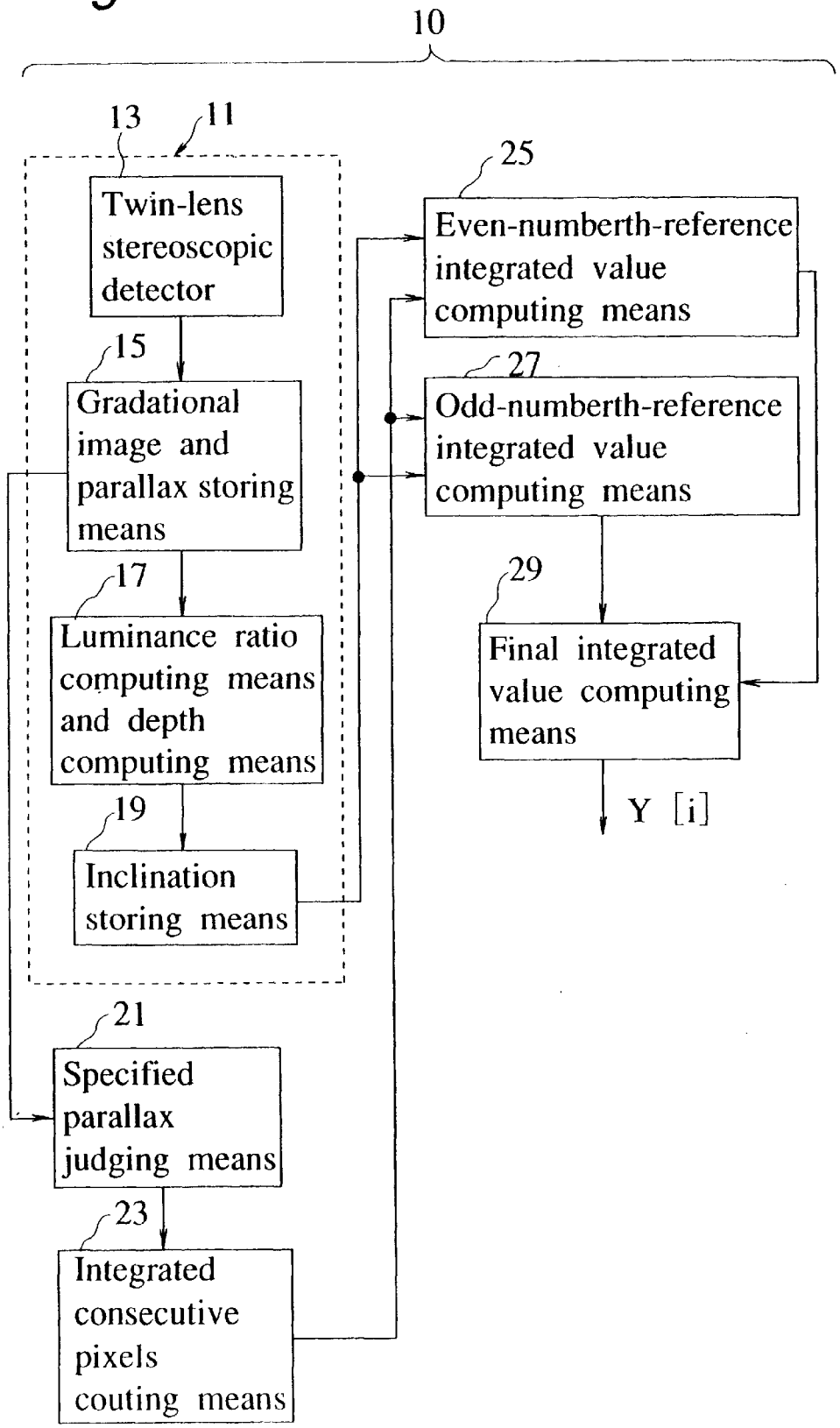
FIG. 1 is a block diagram showing the whole composition of an apparatus according to a first embodiment.
Figure 2:
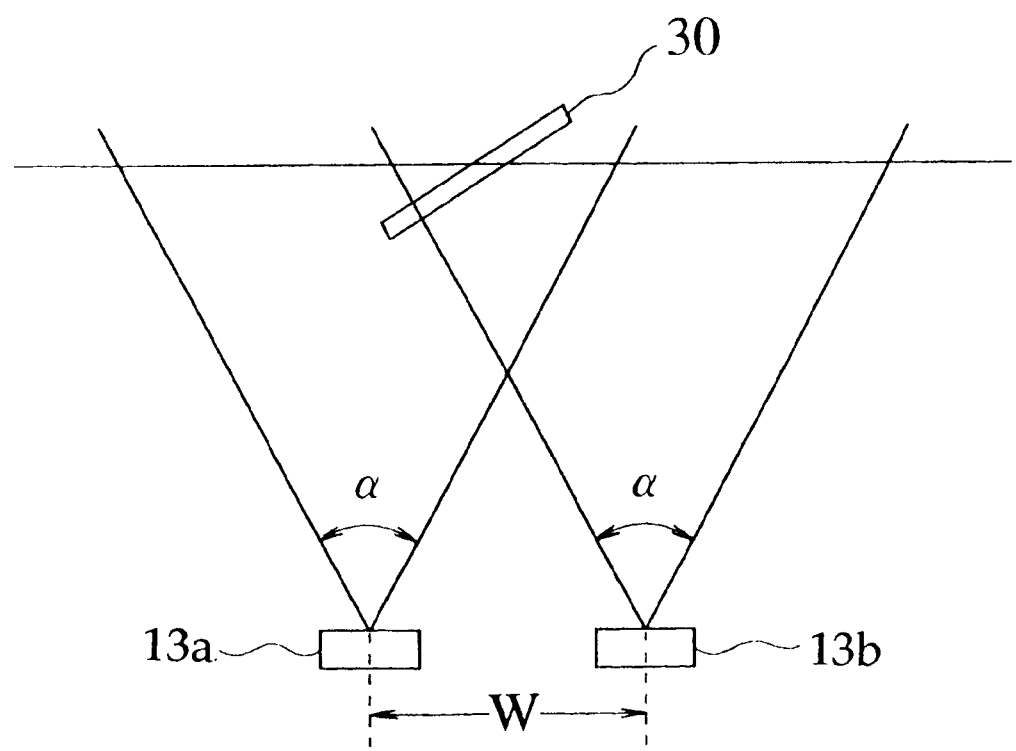
FIG. 2 is a diagram for explaining a positional relation between a subject and two cameras provided on a twin-lens stereoscopic detector.

FIG. 1 is a block diagram showing a shape reconstructing apparatus 10 according to a first embodiment, and FIG. 2 is a diagram showing an arrangement example of a subject 30 and cameras 13a and 13b provided on a twin-lens stereoscopic detector 13. Although FIG. 2 shows the subject 30 like a flat plate, this is only an example.

The shape reconstructing apparatus 10 is provided with an inclination detecting means 11, a specified parallax judging means 21, an integrated consecutive pixels counting means 23, an even-numberth-reference integrated value computing means 25, an odd-numberth-reference integrated value computing means 27, and a final integrated value computing means 29.

In this embodiment, the inclination detecting means 11 is composed of a twin-lens stereoscopic detector 13, a gradational image and parallax storing means 15, a luminance ratio computing means 17 (including a depth computing means in this case), and an inclination storing means 19.

Here, as shown in FIG. 2, the twin-lens stereoscopic detector 13 is provided with two cameras 13a and 13b, and a corresponding pixel finding means (also called a corresponding point finding means, not illustrated). The two cameras 13a and 13b (hereinafter also referred as to a left camera 13a and a right camera 13b) are arranged against the subject 30 so that their optical axes may be in parallel with each other and at a distance W, not limited to this, from each other. Gradational images are obtained by photographing the subject 30 from two different positions by means of the cameras 13a and 13b. These cameras 13a and 13b can be composed of CCD (charge coupled device) cameras, for example. The unillustrated corresponding pixel finding means is a means for detecting in pixel units what pixel position in a gradational image obtained by the right camera 13b (hereinafter also referred to as a right image) corresponds to the pixel position of a pixel in a gradational image obtained by the left camera 13a (hereinafter also referred to as a left image) (and/or for detecting the reverse correspondence to this), namely, a means for detecting a parallax. Such a twin-lens stereoscopic detector 11 can be composed by a technique disclosed, for example, in reference III ("Reconstruction of a curved surface by means of stereoscopy of isoluminance lines" by Ishiyama and Tomita in "THE TRANSACTIONS OF THE INSTITUTE OF ELECTRONICS, INFORMATION, AND COMMUNICATION ENGINEERS OF JAPAN, PART D-II VOL. J77-D-II NO.9, pp.1673 to 1679, SEPTEMBER 1994").

The gradational image and parallax storing means 15 stores a left and a right image and their parallaxes detected by the twin-lens stereoscopic detector 13. Here, a gradational image can be considered typically as the information representing a density distribution of a subject with multi-value digital signals. And the gradational image can be treated as the information representing a density distribution of each color of R (red), G (green), and B (blue) with multi-value digital signals.

The luminance ratio computing means 17 computes inclinations in pixel units on the basis of a subject luminance ratio of pixels corresponding to the same position on the subject in the left and the right image. In this case, the luminance ratio computing means 17 is assumed to compute also a depth value of each part on the subject (described later, using FIG. 7).

The inclination storing means 19 stores in pixel units detected inclinations and furthermore stores depths in this case.

The specified parallax judging means 21 determines an integral interval. In detail, the means 21 is a means for judging whether or not a pixel to be integrated is a pixel being within a specified phase difference, and, when it is so, the means 21 makes the integrated consecutive pixels counting means 23 consecutively count pixels, and, when it is not, the means 21 resets the accumulated partial integral element at an initial value. The integrated consecutive pixels counting means 23 counts the number of pixels used in integration up to the pixel being about to be now integrated including this pixel.

The even-numberth-reference integrated value computing means 25 integrates, by means of a method (described later), inclinations to each pixel as using as the respective reference pixels the even-numberth pixels in a pixel group which has been judged to be within a specified parallax range. The odd-numberth-reference integrated value computing means 27 integrates, by means of a method described later, inclinations to each pixel as using as the respective reference pixels the odd-numberth pixels in a pixel group which has been judged to be within a specified parallax range. The final integrated value computing means 29 computes an average value of integrated values respectively outputted from the even-numberth-reference integrated value computing means 25 and the odd-numberth-reference integrated value computing means 27, and outputs it as a final integrated result.

The means 15 to 29 out of the above-mentioned components can be constructed by means of a computer, for example.

1-2. Shape reconstructing method

Next, a process for reconstructing a shape according to a shape reconstructing method of the present invention is described in the following together with operation of the apparatus 10 explained with FIG. 1.

First, a subject 30 is photographed by means of the two cameras 13a and 13b of the stereoscopic detector 13. By this, gradational images seen from the respective positions of the two cameras 13a and 13b are obtained. Photographing can be performed consecutively, but since the gist of the invention can be explained by a pair of stereoscopic images in this case, an example of using only a pair of images is described.

Figure 3A:
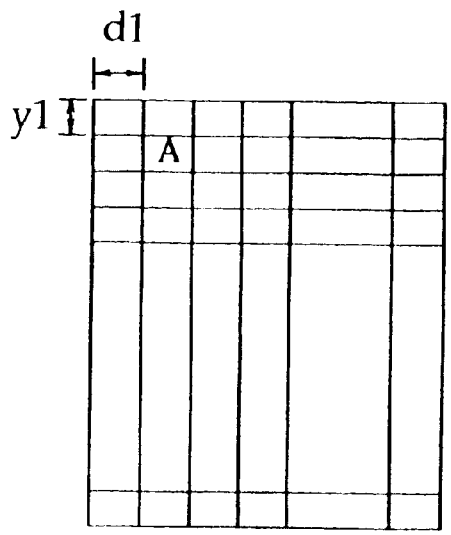
FIGS. 3(A)–3(C), is a diagram for explaining a process for making left and right images correspond to each other and a parallax.
Figure 3B:
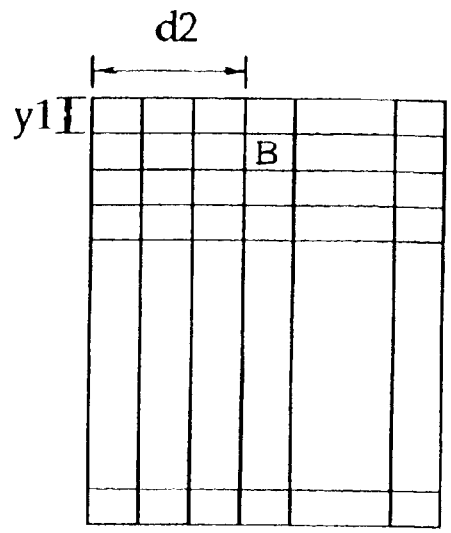
Figure 3C:
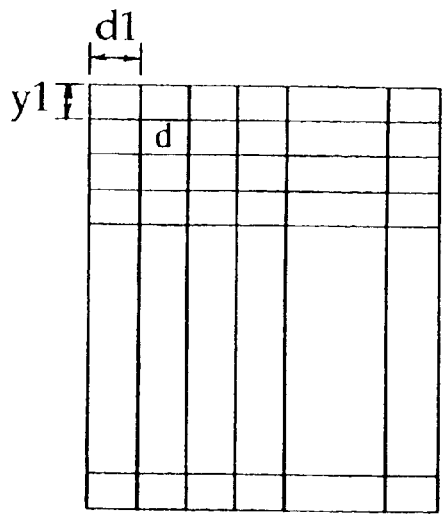

Photographed stereoscopic images (a left image and a right image) are respectively outputted to and stored into the gradational image and parallax storing part 15 as they are, and at the same time the corresponding pixels of the left and the right image by the twin-lens stereoscopic detector 13 are found and a parallax (also called a phase difference) is extracted. Extraction of a parallax is concretely described with reference to FIGS. 3(A) to 3(C). FIG. 3(A) is a diagram schematically showing a state of the left image stored in the gradational image and parallax storing part 15, FIG. 3(B) is a diagram schematically showing a state of the right image stored in the same way, and FIG. 3(C) is a diagram schematically showing a parallax in the same way. A corresponding pixel retrieving means not illustrated scans respectively the left image and the right image in the storing part 15. At this time, the corresponding pixel retrieving means finds the corresponding pixels in the left and the right image as detecting, for example, whether or not image parts whose gradations vary in the same way as each other have appeared. FIGS. 3(A) and 3(B) show an example where a pixel "A" at a position (d1, y1) from the reference point in the left image and a pixel "B" at a position (d2, y1) from the reference point in the right image correspond to each other. According to this, the information given by "d=d2−d1" which is a coordinate difference between pixels corresponding to each other in the left and the right image, namely, a parallax d is stored at a position (d1, y1) of the storing means 15. In the same manner as described above, a parallax is obtained for each of the pixels in the left and the right image.

It is a matter of course that a parallax may be extracted by using the right image as the reference image.

Figure 4A:
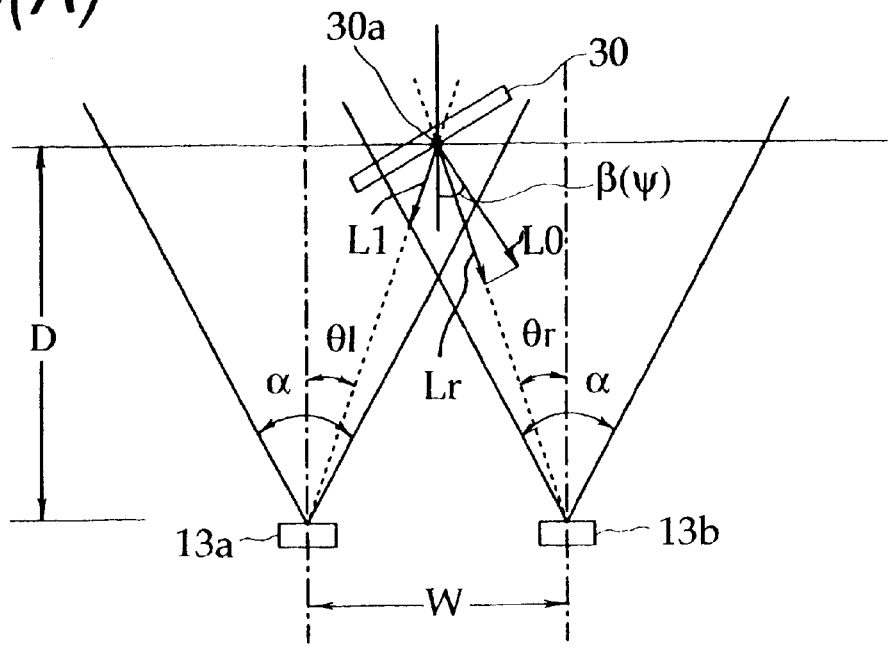
FIGS. 4(A)–4(C), is a diagram for explaining a luminance ratio computing process and an inclination detecting process.
Figure 4B:
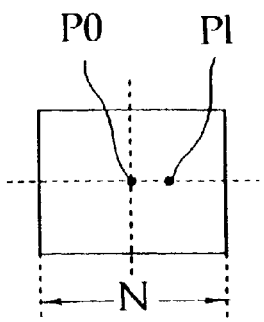
Figure 4C:
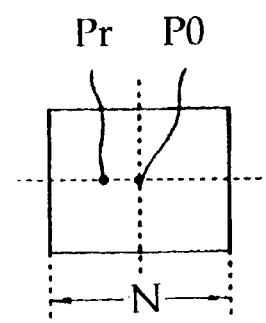

Detection of inclinations of the subject 30 in pixel units can be performed in the following. Since pixels corresponding to each other in the left and the right image are known from the parallax, a luminance ratio of the corresponding pixels is computed. And a surface inclination of each minute part (also called an observed part) on the subject 30 is computed on the basis of the luminance ratio. These processes are concretely described with reference to FIGS. 4(A) to 4(C). FIG. 4(A) shows arrangement of the subject 30 and the two cameras 13*a* and 13*b*, and a state of lights entering the two cameras 13*a* and 13*b* from an observed part 30*a* of the subject 30. FIG. 4(B) is a diagram for explaining a pixel position corresponding to said observed part 30*a* in the gradational image obtained by the left camera 13*a*. FIG. 4(C) is a diagram for explaining a pixel position corresponding to the observed part 30*a* in the gradational image obtained by the right camera 13*b*.

An observed part on the subject 30 is represented by number 30*a*, and Lambert's cosine law is applied to it. Namely, an inclination detecting method is applied which utilizes that luminances entering the two cameras 13*a* and 13*b* from the observed part 30*a* vary in intensity according to a surface inclination of the observed part 30*a*. Thereupon, an incident light L1 entering the left camera 13*a* from the observed part 30*a* and a incident light Lr entering the right camera 13*b* from the observed part 30*a* can be, respectively, represented by the following expressions (1) and (2);

$$L1 = L0 \times \cos(\beta + \theta l) \cos \psi \quad (1)$$

$$Lr = L0 \times \cos(\beta + \theta r) \cos \psi \quad (2),$$

where β is an inclination angle of the observed part 30*a* on the subject 30. In this case, the inclination angle β is considered as an angle which a normal line of the surface of the observed part 30*a* of the subject 30 makes with the respective optical axes of the cameras. And ψ is an angle which the line of sight of the camera (namely, its optical axis) makes with the subject (therefore this is the same as β). And θl is an angle which the optical axis of the left camera 13*a* makes with the line drawn through the left camera 13*a* and the observed part 30*a*, and θr is an angle which the optical axis of the right camera 13*b* makes with the line drawn through the right camera 13*b* and the observed part 30*a*.

A factor to be found is the inclination angle β of the subject. Since L0 is unknown, it is standardized by taking a ratio of L1 and Lr by means of the expressions (1) and (2).

$$Ll/Lr = \{L0 \times \cos(\beta + \theta l)\} / \{L0 \times \cos(\beta + \theta r)\} \quad (3)$$

$$= \cos(\beta + \theta l) / \cos(\beta + \theta r).$$

Since the L1/Lr is an output ratio, namely, a density ratio of pixels corresponding to each other in the left and right image, the expression (3) is rewritten by representing this density ratio as H in the following;

$$L1/Lr = H = \cos(\beta + \theta l)/\cos(\beta + \theta r) \quad (4).$$

By transforming the expression (4), the following expression (5) is obtained;

$$H \cos(\beta + \theta r) = \cos(\beta + \theta l) \quad (5).$$

The expression (5) is transformed as follows;

$$H(\cos \beta \cos \theta r - \sin \beta \sin \theta r) = \cos \beta \cos \theta l - \sin \beta \sin \theta l \quad (6).$$

The expression (6) is transformed as follows;

$$\cos \beta (H \cos \theta r - \cos \theta l) - \sin \beta (H \sin \theta r - \sin \theta l) = 0 \quad (7).$$

And the expression (7) is transformed as follows;

$$\cos \beta (H \cos \theta r - \cos \theta l) = \sin \beta (H \sin \theta r - \sin \theta l) \quad (8).$$

And furthermore, the expression (8) is transformed as follows;

$$(H \cos \theta r - \cos \theta l)/(H \sin \theta r - \sin \theta l) = \sin \beta / \cos \beta = \tan \beta \quad (9).$$

The θl in the expression (9) can be obtained from a pixel position corresponding to the observed part 30*a* in the left image, and the θr can be obtained from a pixel position corresponding to the observed part 30*a* in the right image. Namely, as shown in FIG. 4(B), the observed part 30*a* on the line of sight making an angle θl with the optical axis of the camera 13*a* appears at a pixel position P1 in an image which is composed of N pixels and has an angle of view a. Accordingly, the angle θl to give the pixel position P1 can be given by the following expression (a);

$$\theta l = \tan^{-1} \{\{2(P1-P0)/N\} \times \tan(a/2)\} \quad (a),$$

where P0 is the central pixel position of the image. In the same way, as shown in FIG. 4(C), the observed part 30*a* on the line of sight making an angle θr with the optical axis of the camera 13*b* appears at a pixel position Pr in an image which is composed of N pixels and has an angle of view a. Accordingly, the angle θr to give the pixel position Pr can be given by the following expression (b);

$$\theta r = \tan^{-1} \{\{2(Pr-P0)/N\} \times \tan(a/2)\} \quad (b).$$

As clearly known from the expressions (9), (a), and (b), it can be understood that the inclination angle β of the observed part 30*a* of the subject 30 is obtained on the basis of a luminance ratio of the left and the right image, concretely, on the basis of a luminance ratio of pixels corresponding to each other in the left and the right image, the angle of view a of the cameras 13*a* and 13*b*, the pixel positions of the corresponding pixels in the left and the right image, and the image size N of the left and the right image. Since which should be a numerator or a denominator, the luminance value Ll of the left image or the luminance value Lr of the right image relates to plus or minus of the inclination of a pixel surface, it will do to determine this problem in advance and this is not an essential problem.

And the observed part 30*a* of the subject 30 is successively shifted to another position and its inclination angle is detected in the same procedure as described above. In this way, surface inclinations of the subject 30 can be detected in pixel units. The surface inclinations of the subject detected in pixel units are stored in the inclination storing means 19.

Figure 5:
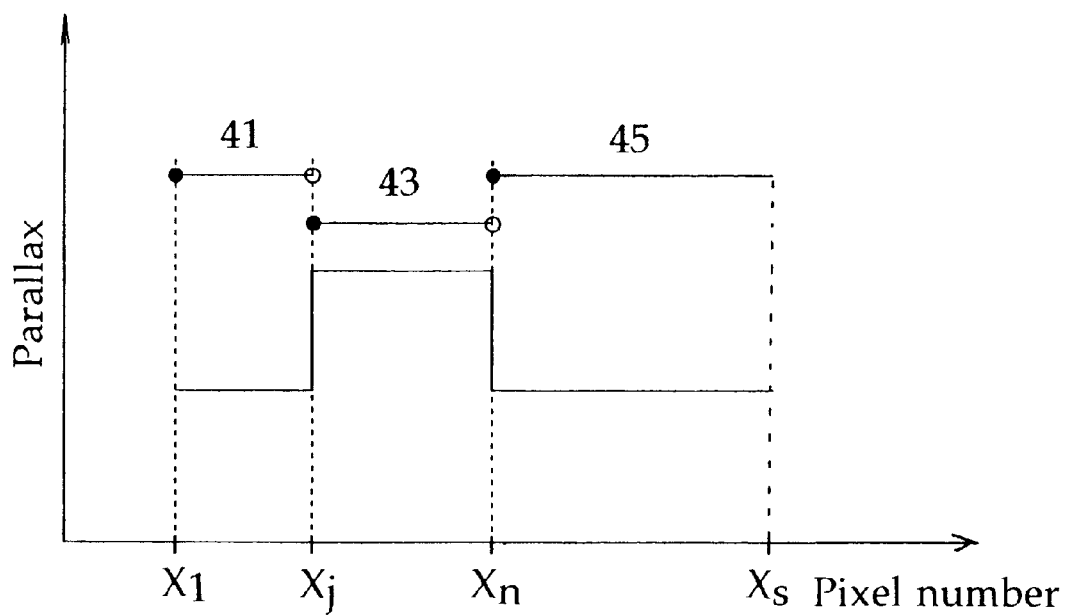
FIG. 5 is a diagram for explaining an integral interval determining process.

Inclinations of a subject detected in pixel units as described above come out on a plane in parallel with the direction of arrangement of the cameras 13*a* and 13*b* (a plane along W in FIG. 4). Namely, an inclination of each pixel can be numerically obtained along an epipolar line. A shape of a subject can be reconstructed by integrating these inclinations in pixel units as described in the following by means of a technique according to the invention. In this case, integration is performed separately for each scanning line. Furthermore, the integration is performed as considering a pixel group showing a specified parallax as one integral interval. When a pixel group showing a parallax other than the specified parallax has appeared, the integrated value is reset and then the pixel group consecutively showing that parallax is newly integrated. FIG. 5 shows schematically an integral interval determining process. FIG. 5 shows an example in which a group of pixels $X_1$ to $X_{j-1}$ being d in parallax is a first integral interval 41, a group of pixels $X_j$ to $X_{n-1}$ being $d_x$ in parallax is a second integral interval 43, and a group of pixels $X_n$ to $X_s$ being d in parallax is a third integral interval 45. Whether or not a pixel to be processed is a pixel having a specified parallax is judged by the specified parallax judging means 21.

The partial integration known in mathematics is applied to integration of an inclination on each pixel in a pixel group showing a specified parallax. A fundamental expression is the following expression (10);

$$\int f(x)dx = xf(x) - \int f'(x)dx \tag{10}.$$

In the expression (10), the left side is an ordinary integration, the first term of the right side is an integrand function multiplied by a variable x, and the second term of the right side is a differentiated integrand function multiplied by a variable x.

The f'(x) of the differential part is usually represented as $(X_i - X_{i-1})$ by a quantizing representation. Accordingly, in this application, an integrated value F(x) is obtained by the following expression;

$$F(x) = xf(x) - \Sigma x(X_i - X_i - l) \tag{11}.$$

Namely, since f(x) is a quantified quantity, f'(x) is replaced with a difference $(X_1 - X_{i-1})$. In case of obtaining an integrated value by means of this expression (11), since the first term becomes a value obtained by multiplying the inclination value itself of a surface by the number of consecutive pixels from an integration starting point (called also the number of integrated consecutive pixels), this value has no accumulation of integral errors. On the other hand, since the second term adds to one another a difference between inclinations of surfaces adjacent to each other by the number of integrated consecutive pixels, the second term becomes a value in which integral errors are accumulated. Thereupon, the present invention performs the following process.

First, using inclinations on the even-numberth pixels in a pixel group within an integral interval as the respective reference values, an integrated value up to each measured value (even-numberth-reference integrated value) Ye(i) is obtained by means of the following processes (a) to (c). And using inclinations on the odd-numberth pixels in the pixel group within the integral interval as the respective reference values, an integrated value up to each measured value (odd-numberth-reference integrated value) Yo(i) is obtained by means of the following processes (a) to (c). And an average value of said even-numberth-reference integrated value Ye(i) and one of said odd-numberth-reference integrated value Yo(i-1), said odd-numberth-reference integrated value Yo(i), and said odd-numberth-reference integrated value Yo(i+1) is taken as a final integrated result Y(i) up to each measured value. Here, i is a place number in a row of the measured values.

(a) A process of obtaining a difference between an inclination on said reference pixel and an inclination on a pixel adjacent to it, obtaining a partial integral element by multiplying said difference by a specified factor, and accumulating said partial integral element on a partial integral element obtained before it.

(b) A process of multiplying an inclination on said reference pixel by said specified factor, substracting said accumulated partial integral element from this multiplied result, and taking said subtracted result as an integrated value up to said reference pixel, and (c) A process of obtaining integrated values up to the respective reference pixels by applying said processes (a) and (b) to inclinations on the reference pixels, and complementing an integrated value up to a pixel adjacent to said reference pixel with an integrated value obtained by applying said processes (a) and (b) to said reference pixel.

In this embodiment, the above-mentioned processes (a) to (c) are concretely performed as follows.

An even-numberth-reference integrated value Ye[i] is obtained by the following expressions;

$$Y_0[i] = n \times (x[i] - x[i-1]) \tag{12a}$$

$$Ae = \Sigma Y_{0[i]} \tag{12b}$$

$$Ye[i] = n \times (x[i]) - Ae \tag{12c},$$

where i=n=2, 4, 6 and so on (even number). And Ye[i+1] is complemented by Ye[i]. Here, Ae is an accumulated partial integral element when computing an even-numberth-reference integated value.

An odd-numberth-reference integrated value Yo[i] is obtained by the following expressions;

$$Y_1[i] = (n-1) \times (x[i] - x[i-1]) \tag{13a}$$

$$Ao = \Sigma Y(1)[i] \tag{13b}$$

$$Yo[i] = (n-1) \times (x[i]) - Ao \tag{13c},$$

where i=n=1, 3, 5 and so on (odd number). And Yo[i+1] is complemented by Yo[i]. Here, Ao is an accumulated partial integral element when computing an odd-numberth-reference integated value.

And an average value having the greatest effect of suppressing an abnormal inclination caused by a single-shot noise and the like among the average values obtained by the following expressions;

$$Y[i]_1 = (Ye[i] + Yo[i+1])/2 \tag{14a},$$

$$Y[i]_2 = (Ye[i] + Yo[i])/2 \tag{14b, and}$$

$$Y[i]_3 = (Ye[i] + Yo[i-1])/2 \tag{14c},$$

is taken as a final integrated result Y[i].

Although a difference in the expression (12a) or (13a) is taken between a reference pixel x[i] and a pixel X[i-1] which is adjacent to the reference pixel x[i] in the descending direction, in certain circumstances a difference may be taken between a reference pixel and a pixel which is adjacent to the reference pixel in the ascending direction.

According to the method of the invention, integration of a difference between an even-numberth inclination and an odd-numberth inclination and integration of a difference between an odd-numberth inclination and an even-numberth inclination are separately performed as integration of a difference between inclinations on pixels adjacent to each other. In case that the integrations are separately performed in this way, for example when an inclination value on a pixel is an inclination value on which a single-shot noise is superposed, this single-shot noise is, for example, integrated as a positive noise in integration using an odd-numberth pixel as a reference pixel, while this single-shot noise is integrated as a negative noise in integration using an even-numberth pixel as a reference pixel. Thereupon, when taking an average of an even-numberth-reference integrated value and an odd-numberth-reference integrated value which have the same number of integrated consecutive pixels, the said positive noise and the negative noise cancel each other and the noises can be removed. Namely, a method which does not accumulate a single-shot noise as an integral error can be implemented.

This is described using a concrete example. A case of data representing a pixel group having the same parallax in which inclinations of the respective pixels are shown as x[1] to x[28] in Table 1 (described later) is described, where it is assumed that a single-shot noise is superposed on each of pixel numbers 10 and 20. In this case, an even-numberth reference integrated value Ye[i] can be obtained by the expressions (12a) to (12c), and an odd-numberth reference integrated value Yo[i] is obtained by the expressions (13a) to (13c), and in order to have the invention more deeply understood, some of them are obtained for trial.

First, Ye[1] is assumed to be 0.

Next, Ye[2] is obtained.

$$Yo[2]=n\times(x[2]-x[1])=2\times(1-1)=0$$

$$Ae=Y_o[2]=0$$

$$Ye[2]=n\times x[2]-Ae=2\times1-0=2.$$

Accordingly, "Ye[2]=2" is obtained. Since Ye[3] is complemented by Ye[2], "Ye[3]=2" is obtained.

Next, Ye[4] is obtained.

$$Y_o[4]=n\times(x[4]-x[3])=4\times(1-1)=0$$

$$Ae=Y_o[2]+Y_o[4]=0+0=0$$

$$Ye[4]=n\times x[4]-Ae=4\times1-0=4.$$

Accordingly, "Ye[4]=4" is obtained. Since Ye[5] is complemented by Ye[4], "Ye[5]=4" is obtained.

In the same way as above, an even-numberth-reference integrated value Ye(i) having inclinations of the even-numberth pixels as the reference inclinations is obtained. The result is shown in the column Ye[i] of Table 1.

On the other hand, an odd-numberth-reference integrated value is obtained as follows.

First, Yo[1] is assumed to be 0. Since x[i−1] to x[1] is a value outside the present integral interval, namely, is a parallax different from a specified parallax, 0 is given to its integrated value. The reason is that this process is not performed, in case of processing a pixel on the boundary of the integral interval, an abnormal value may be integrated for the pixel, depending upon images. Since Yo[2] is complemented by Yo[1], "Yo[2]=0" is obtained.

Next, Ye[3] is obtained.

$$Y_1[3]=(n-1)\times(x[3]-x[2])=(3-1)\times(1-1)=0$$

$$Ao=Y_1[3]=0$$

$$Yo[3]=(n-1)\times x[3]-Ao=(3-1)\times1-0=2.$$

Accordingly, "Yo[3]=2" is obtained. Since Yo[4] is complemented by Yo[3], "Yo[4]=2" is obtained.

Next, Ye[5] is obtained.

$$Y_1[5]=(n-1)\times(x[5]-x[4])=(5-1)\times(1-1)=0$$

$$Ao=Y_1[3]+Y_1[5]=0+0=0$$

$$Yo[5]=(n-1)\times x[5]-Ao=(5-1)\times1-0=4.$$

Accordingly, "Ye[5]=4" is obtained. Since Yo[6] is complemented by Yo[5], "Ye[6]=4" is obtained.

In the same way as above, an odd-numberth-reference integrated value Yo(i) having inclinations of the odd-numberth pixels as the reference inclinations is obtained. The result is shown in the column Yo[i] of Table 1.

Figure 6:
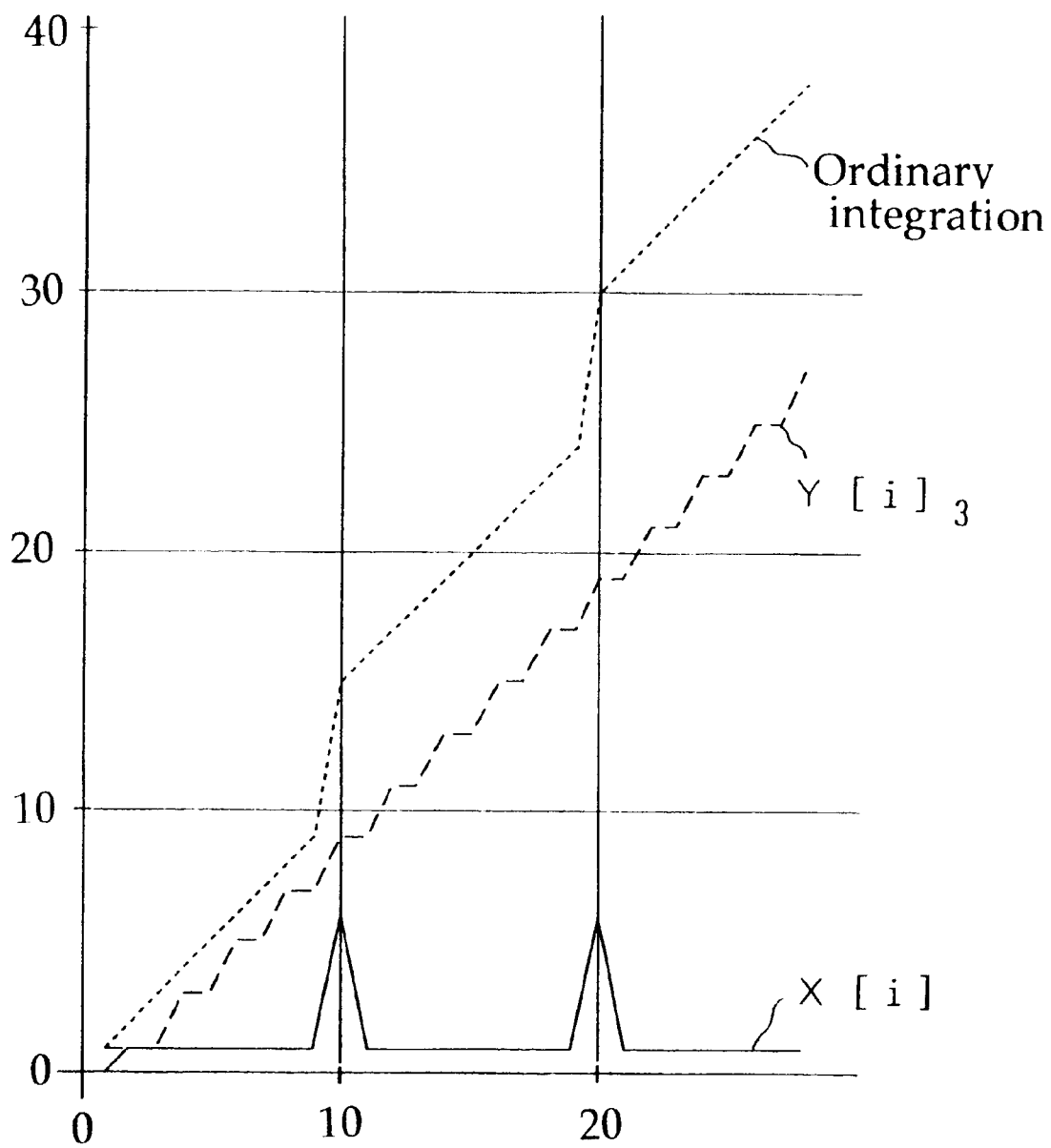
FIG. 6 is a diagram for showing a processed result in the first embodiment.

Next, a final integrated value Y[i] is obtained. In this case, $Y[i]_1$, $Y[i]_2$, and $Y[i]_3$ are respectively obtained according to the said expressions (14a), (14b), and (14c). The results are shown respectively in the columns of $Y[i]_1$, $Y[i]_2$, and $Y[i]_3$ of Table 1. In Table 1, a result by an ordinary integration is also shown in the column "O.I." for comparison. As known from Table 1, in case of $Y[i]_1$, abnormal values caused by single-shot noises are perceived in the pixel numbers 10, 11, 20, and 21. In case of $Y[i]_2$, abnormal values caused by single-shot noises are perceived in the pixel numbers 11 and 21. In case of $Y[i]_3$, abnormal values caused by single-shot noises have been removed. In this case, therefore, it is understood that it is proper to obtain a final integrated result according to "$Y[i]_3=(Ye[i]+Yo[i-1])/2$". The reason is that a state of $Y[i]_3$ brings that an average is taken in a state where a specified count "n" in case of obtaining an even-numberth-reference integrated value and a specified count "n−1" in case of obtaining an odd-numberth-reference integrated value are matched with each other, namely, a state where the respective numbers of integrated consecutive pixels are the same as each other. In case of $Y[i]_1$ or $Y[i]_2$ also, since single-shot noises appear only on some limited pixels without being accumulated on the integrated result and a regular integration is performed, $Y[i]_1$ or $Y[i]_2$ may be taken as a final integrated result in some specifications. On the other hand, in an ordinary integration, all single-shot noises are accumulated on the integrated values of the pixel number 10 and later. In an ordinary integration, since an operation to cancel single-shot noises is not performed, an accumulated error is finally made great and generally an error to be superposed on a scanning line greatly varies with each scanning line in an image, some great noises in the shape of horizontal stripes appear on the image after integration, but the present invention can suppress such a problem. In order to make clearer difference between an integration according to the invention and an ordinary integration, FIG. 6 shows together an inclination x[i] on each pixel, a final integrated result $Y[i]_3$, and an ordinary integrated result.

According to a shape reconstructing method and an apparatus of the first embodiment, integration using the even-numberth pixels as the respective reference pixels and integration using the odd-numberth pixels as the respective reference pixels can be performed in parallel with each other in case of integrating inclinations in pixel units, and an average value of integrated values (Ye[i] and Yo[i−1]) of the corresponding pixels which are matched with each other in a specified factor (the number of integrated consecutive pixels) used in the respective integrations can be taken as a final integrated result. Accordingly, since an integrated value of inclination values can be obtained as canceling influences of quantizing errors and noises which appear in the shape of a single-shot noise generally in photographing, an integrating technique little influenced by quantizing errors and noises can be implemented. And a surface inclination can be computed along an epipolar line and integration can be performed along the same direction as the computing direction. Therefore, the invention has an advantage that an integrated value along the computing direction of inclination values theoretically obtained can be obtained. In case of adopting a technique of selecting an integral path as the prior art, as the integral path may be, integration may be sometimes performed along a direction deviated from the direction of computing a surface inclination, but the present invention can prevent such a trouble. And since an integral interval is determined on the basis of parallax, an integral boundary can be easily and clearly obtained. Therefore, the shape of only an object to be desired can be reconstructed.

Since the invention removes noises by utilizing the fact that how noise signals appear is different between a difference between an even-numberth reference pixel and a pixel adjacent to it and a difference between an odd-numberth reference pixel and a pixel adjacent to it, the invention can dispense with such a technique liable to distort an integrated value as a technique of artificially controlling integration and the like, and can perform an integration of good reproductive quality depending upon an original image itself.

A shape reconstructing method of the invention can be combined with the following process, for example. That is to say, the method is combined with a process of detecting a depth (vertical distance) D from the line segment connecting the cameras 13a and 13b to an observed part 30a on the subject 30 by means of the principle of a stereoscopic imaging method and a triangulation method. This is concretely described in the following.

Figure 7:
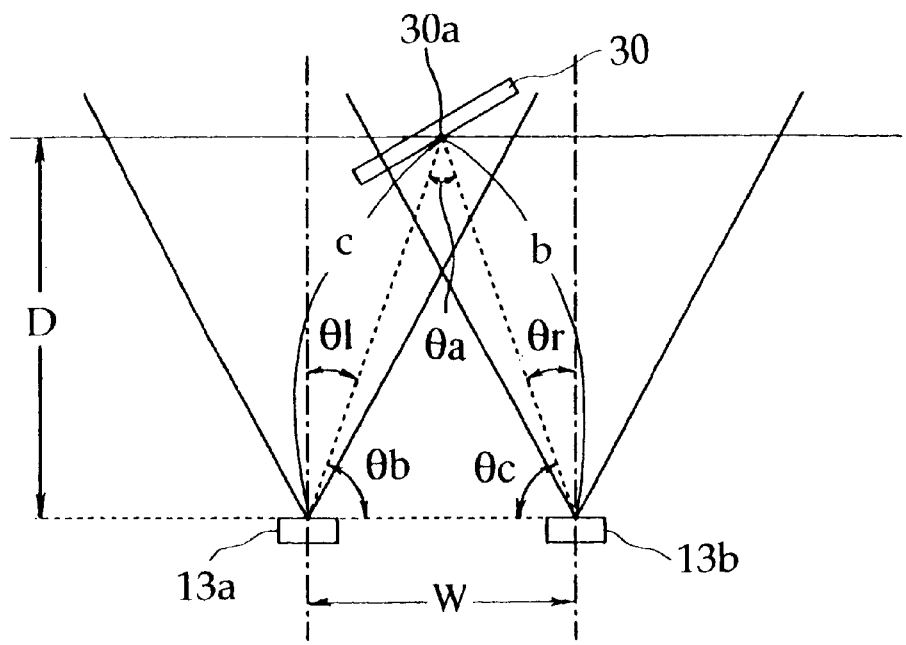
FIG. 7 is a diagram for explaining a depth (distance value) computing process.

As shown in FIG. 7, from the law of sines, the following expression;

w/sin$\theta$a=b/sin$\theta$b=c/sin$\theta$c is obtained, where $\theta$a, $\theta$b, and $\theta$c are, respectively, interior angles of a triangle composed of the camera 13a, the camera 13b, and the observed part 30a on the subject 30. And b and c are lengths of the other sides than a distance w between the cameras in the triangle. Accordingly, the following expression (i);

$$b=(w/\sin \theta a) \times \sin \theta b \quad \text{(i)}$$

is obtained. The depth D to be detected is obtained for example as the following expression (ii);

$$D=b \times \sin \theta c \quad \text{(ii)}.$$

Thereupon, substituting the expression (i) for b in the expression (ii), $$D=(w \times \sin \theta b \times \sin \theta c)/\sin \theta a \quad \text{(iii)}$$

is obtained.

In these expressions, $\theta$b=$\pi$/2−$\theta$l, $\theta$c=$\pi$/2−$\theta$r, and qa=$\pi\theta$b−$\theta$c. The $\theta$l and $\theta$r are given by the said expressions (a) and (b). Accordingly, the depth D can be obtained.

Even a fine raggedness can be reconstructed by superposing on each other a depth D obtained in this way and inclinations obtained by the method of the invention.

For example, in case that a distance between a subject and cameras is about 1 m, the camera's angle of view is about 13 degrees, an interval between the two cameras is about 6.5 cm, and the camera's CCD has pixels of 640×480 or so, only an existing technique of reconstructing a shape by means of a stereoscopic imaging method and a triangulation method can have a distance resolution of only at least several centimeters and can only give a flat image in case of measuring a person's face and the like, but a rugged part such as its nose and the like can be obtained by superposing an inclination value obtained by a method of the invention on an inclination value obtained by the existing method.

2. Second Embodiment

Next, a second embodiment is described in the following. The second embodiment detects whether inclinations x[i] and x[i−1] between which a difference is taken are equal or unequal in sign to each other. And in case that both x[i] and x[i−1] are positive or negative, the processes explained in the first embodiment are performed, but in case that x[i] and x[i−1] are different in sign from each other, this embodiment resets said specified factor ("n" or "n−1") and an accumulated value of partial integral elements (Ae or Ao) and stores an even-numberth-reference integrated value Ye[i] and an odd-numberth-reference integrated value Yo[i] respectively as basic values Ve and Vo, and then applies the processes explained in the first embodiment to inclinations x[i] on and after that time. In this case, a value (Ve+Ye[i]) obtained by adding said basic value Ve to an even-numberth-reference integrated value obtained by those processes is taken as the applicable even-numberth-reference integrated value and a value (Vo+Yo[i]) obtained by adding said basic value Vo to an odd-numberth-reference integrated value obtained by those processes is taken as the applicable odd-numberth-reference integrated value.

Figure 8:
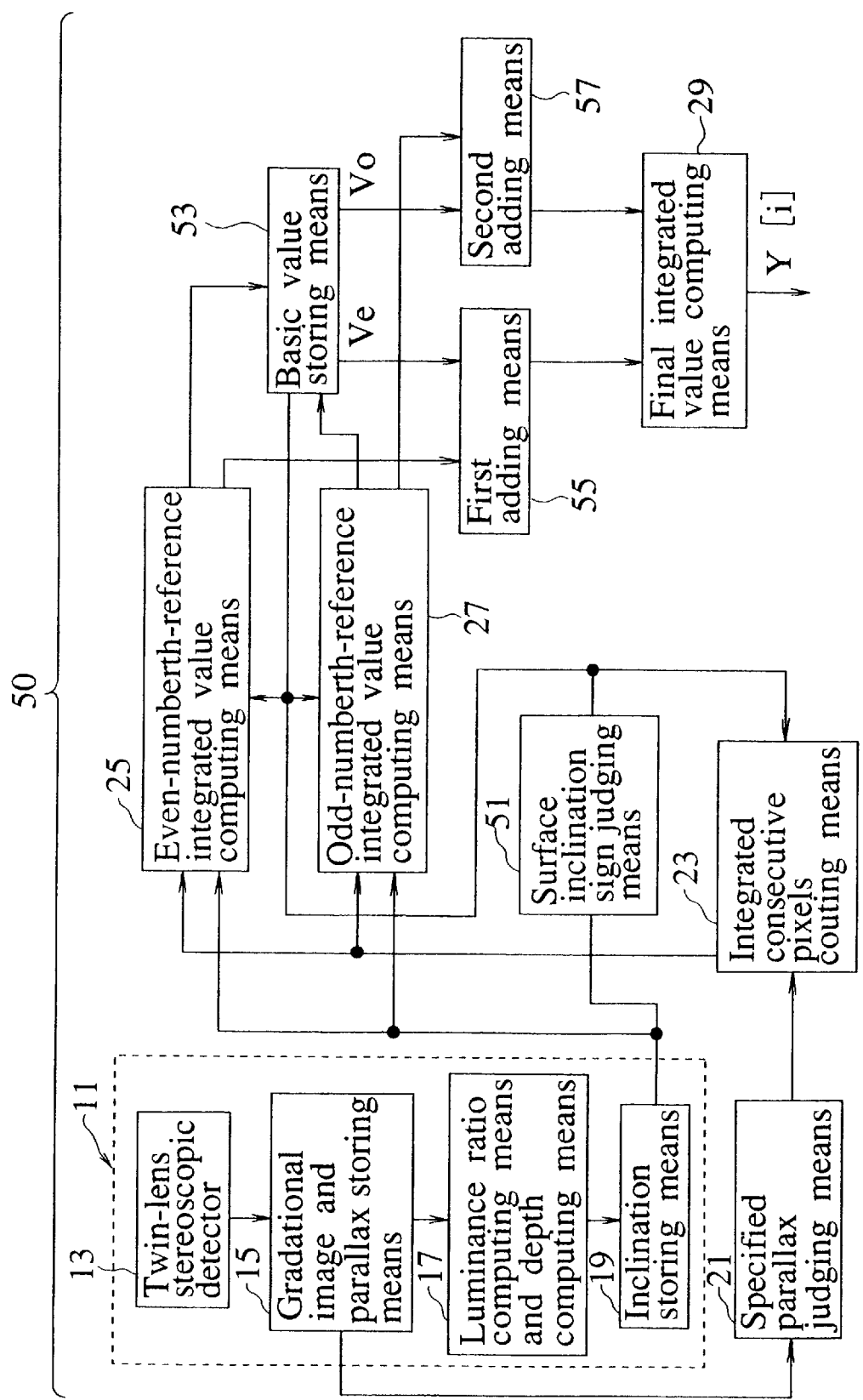
FIG. 8 is a block diagram showing the whole composition of an apparatus according to a second embodiment.

FIG. 8 is a block diagram showing an apparatus 50 suitable for implementing a shape reconstructing method of the second embodiment. This apparatus 50 is composed of a surface inclination sign judging means 51, a basic value storing means 53, a first adding means 55 and a second adding means 57, in addition to the components which the apparatus 10 explained with reference to FIG. 1 are provided with.

The surface inclination sign judging means 51 judges signs of inclinations x[i] and x[i−1] between which a difference is taken, and outputs an instructing signal Sc to the after-stage circuits in case that they are different in sign from each other. The instructing signal Sc is outputted to an integrated consecutive pixels counting means 23, an even-numberth-reference integrated value computing means 25, an odd-numberth-reference integrated value computing means 27, and a basic value storing means 53. The instructing signal Sc is used as a signal to reset an integrated consecutive pixels count in the integrated consecutive pixels counting means 23, and is used as a signal to reset accumulated partial integrated elements Ae and Ao in the even-numberth-reference integrated value computing means 25 and the odd-numberth-reference integrated value computing means 27. Furthermore, to the basic value storing means 53 the instructing signal Sc acts as a latching signal which latches a presently obtained even-numberth-reference integrated value Ye[i] as a basic value Ve and latches a value which latches a presently obtained odd-numberth-reference integrated value Yo[i] as a basic value Vo. The basic value storing means 53 is assumed to store 0 as basic values Ve and Vo in an initial state.

Next, in order to have a processing method of the second embodiment more deeply understood, the processing procedures are described by means of a concrete example. A case of data representing a pixel group which has the same parallax and in which inclinations on the respective pixels are shown as x[1] to x[28] in Table 2 described later is described, where it is assumed that an inclination sign is changed to minus at the pixel number 16.

For data of pixel numbers 1 to 15, an even-numberth-reference integrated value Ye[i] and an odd-numberth-reference integrated value Yo[i] can be obtained one after another in the procedures explained in the first embodiment. In case of this example, the surface inclination sign judging means 51 detects that the sign of data has changed when attempting to process the data of the pixel number 16. Hereupon, the surface inclination sign judging means 51 outputs an instructing signal Sc to the respective components 23, 25, 27, and 53. Responding to this instructing signal Sc, the basic value storing means 53 stores as basic values Ve and Vo, respectively, integrated values obtained by integration up to the (i-1)th pixel, namely, an even-numberth-reference integrated value "Ye[15]=104" and an odd-numberth-reference integrated value "Yo[15]=218". And responding to this instructing signal Sc, the integrated consecutive pixels counting means 23 resets an integrated consecutive pixels count "n" at the initial value "0", and the even-numberth-reference integrated value computing means 25 and the odd-numberth-reference integrated value computing means 27 reset the respective accumulated partial integrated elements Ae and Ao at the initial value "0". Next, in a state of considering the pixel number 16 as the pixel number 1, data of the pixel number 16 and later are processed in the same procedures as the first embodiment. Concretely, the following processes are performed.

Since the even-numberth-reference integrated value Ye[16] of data of the pixel number 16 is processed as considering this pixel number as 1, if there is nothing in particular, it is treated as 0. In this case, however, since the basic value Ve is 104, the even-numberth-reference integrated value Ye[16] of data of the pixel number 16 eventually comes to be "0+104=104". Since the odd-numberth-reference integrated value Yo[16] of data of the pixel number 16 is processed as considering this pixel number as 1, if there is nothing in particular, it is treated as 0. In this case, however, since the basic value Vo is 218, the odd-numberth-reference integrated value Yo[16] of data of the pixel number 16 eventually comes to be "0+218=218". And since the odd-numberth-reference integrated value Yo[17] of data of the pixel number 17 is complemented by Yo[16], it becomes 218.

Next, since the even-numberth-reference integrated value Ye[17] of data of the pixel number 17 is processed as considering this pixel number as 2, if there is nothing in particular, it can be obtained by said expressions (12a), (12b), and (12c) and so it is obtained as follows;

$$Y_o[17]=2\times(x[17]-x[16])=2\times(-16-(-15))=-2$$

$$Ae=-2$$

$$Ye[17]=2\times(x[17])-Ae=2\times(-16)-(-2)=-30.$$

However, since a process of "Ve+Ye[17]" is performed, the even-numberth-reference integrated value Ye[17] of data of the pixel number 17 eventually comes to be "-30+104=74". And since the even-numberth-reference integrated value Ye[18] is complemented by Ye[17], it becomes 74.

The even-numberth-reference integrated values Ye[i] and the odd-numberth-reference integrated values Yo[i] for the pixel number 18 and later are respectively obtained by processing them in said procedures. The results are shown, respectively, in the columns Ye[i] and Yo[i] in Table 2.

Figure 9:
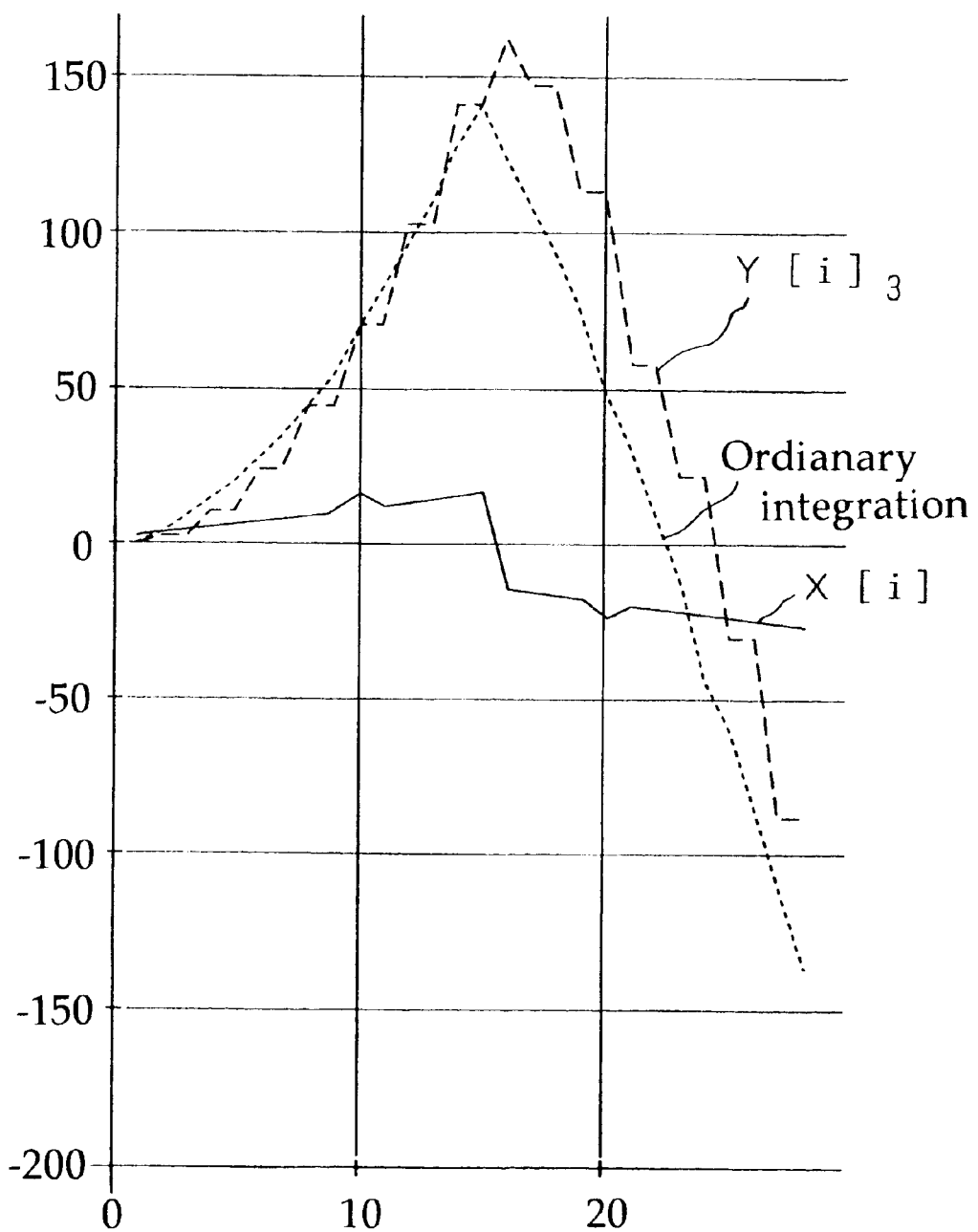
FIG. 9 is a diagram for showing a processed result in the second embodiment.

A final integrated result is obtained as an average value of outputs of the first adding means 55 and the second adding means 57. The average value can be one of $Y[i]_1$, $Y[i]_2$, and $Y[i]_3$ in the same way as the first embodiment. In case of the second embodiment also, it is desirable for reducing an integral error that the average value is obtained according to "$Y[i]_3=(Ye[i]+Yo[i-1])/2$". FIG. 9 shows together an inclination x[i] on each pixel, a final integrated result $Y[i]_3$, and an ordinary integrated result, in order to make more clear difference between the integration according to the invention and an ordinary integration.

According to a method of this embodiment, since data ranging from plus to minus in sign can be also integrated, this embodiment of the invention has a wider application field in comparison with the first embodiment.

Although a case of a twin-lens stereoscopic imaging method has been described above, a multi-lens stereoscopic imaging method may be applied. In that case, since it will do to think of the first image pair to the nth image pair obtained from the respective photographing positions, it is a matter of course that the present invention can be applied.

And it is apparent also that after distance images or parallaxes are obtained by means of other means than a stereoscopic camera, the invention can be applied to them. As an example of the former, there is a method of obtaining gradational images from plural positions by moving a camera.

Although an example of applying a measured value processing method of the invention to processing inclinations detected in pixel units has been described in the above explanations, a measured value processing method of the invention can be applied widely also to other processes for integrating measured values without being limited to the above-mentioned integration of inclinations.

TABLE 1

| i | X[i] | Ye[i] | Yo[i] | $Y[i]_1$ | $Y[i]_2$ | $Y[i]_3$ | O.I. |
|---|------|-------|-------|----------|----------|----------|------|
| 1 | 1 | 0 | 0 | 0 | 0 | 0 | 1 |
| 2 | 1 | 2 | 0 | 2 | 1 | 1 | 2 |
| 3 | 1 | 2 | 2 | 2 | 2 | 1 | 3 |
| 4 | 1 | 4 | 2 | 4 | 3 | 3 | 4 |
| 5 | 1 | 4 | 4 | 4 | 4 | 3 | 5 |
| 6 | 1 | 6 | 4 | 6 | 5 | 5 | 6 |
| 7 | 1 | 6 | 6 | 6 | 6 | 5 | 7 |
| 8 | 1 | 8 | 6 | 8 | 7 | 7 | 8 |
| 9 | 1 | 8 | 8 | 8 | 8 | 7 | 9 |
| 10 | 6 | 10 | 8 | 35 | 9 | 9 | 15 |
| 11 | 1 | 10 | 60 | 35 | 35 | 9 | 16 |
| 12 | 1 | -38 | 60 | 12 | 11 | 11 | 17 |
| 13 | 1 | -38 | 62 | 12 | 12 | 11 | 18 |
| 14 | 1 | -36 | 62 | 14 | 13 | 13 | 19 |
| 15 | 1 | -36 | 64 | 14 | 14 | 13 | 20 |
| 16 | 1 | -34 | 64 | 16 | 15 | 15 | 21 |
| 17 | 1 | -34 | 66 | 16 | 16 | 15 | 22 |
| 18 | 1 | -32 | 66 | 18 | 17 | 17 | 23 |
| 19 | 1 | -32 | 68 | 18 | 18 | 17 | 24 |
| 20 | 6 | -30 | 68 | 70 | 19 | 19 | 30 |
| 21 | 1 | -30 | 170 | 70 | 7 | 19 | 31 |
| 22 | 1 | -128 | 170 | 22 | 21 | 21 | 32 |
| 23 | 1 | -128 | 172 | 22 | 22 | 21 | 33 |
| 24 | 1 | -126 | 172 | 24 | 23 | 23 | 34 |
| 25 | 1 | -126 | 174 | 24 | 24 | 23 | 35 |
| 26 | 1 | -124 | 174 | 26 | 25 | 25 | 36 |
| 27 | 1 | -124 | 175 | 26 | 26 | 25 | 37 |
| 28 | 1 | -122 | 176 | 28 | 27 | 27 | 38 |

$$Y[i]_1 = \frac{Ye[i] + Yo[i+1]}{2}$$

$$Y[i]_2 = \frac{Ye[i] + Yo[i]}{2}$$

$$Y[i]_3 = \frac{Ye[i] + Yo[i-1]}{2}$$

O.I.: Ordinary integration

TABLE 2

| i | X[i] | Ye[i] | Yo[i] | $Y[i]_1$ | $Y[i]_2$ | $Y[i]_3$ | O.I. |
|---|------|-------|-------|----------|----------|----------|------|
| 1 | 2 | 0 | 0 | 0 | 0 | 0 | 2 |
| 2 | 3 | 4 | 0 | 5 | 2 | 2 | 5 |
| 3 | 4 | 4 | 6 | 5 | 5 | 2 | 9 |
| 4 | 5 | 14 | 6 | 16 | 10 | 10 | 14 |
| 5 | 6 | 14 | 18 | 16 | 16 | 10 | 20 |

TABLE 2-continued

| i | X[i] | Ye[i] | Yo[i] | Y[i]$_1$ | Y[i]$_2$ | Y[i]$_3$ | O.I. |
|---|---|---|---|---|---|---|---|
| 6 | 7 | 30 | 18 | 33 | 24 | 24 | 27 |
| 7 | 8 | 30 | 36 | 33 | 33 | 24 | 35 |
| 8 | 9 | 52 | 36 | 56 | 44 | 44 | 44 |
| 9 | 10 | 52 | 60 | 56 | 56 | 44 | 54 |
| 10 | 16 | 80 | 60 | 110 | 70 | 70 | 70 |
| 11 | 12 | 80 | 140 | 110 | 110 | 70 | 82 |
| 12 | 13 | 64 | 140 | 120 | 102 | 102 | 95 |
| 13 | 14 | 64 | 176 | 120 | 120 | 102 | 109 |
| 14 | 15 | 104 | 176 | 161 | 140 | 140 | 124 |
| 15 | 16 | 104 | 218 | 161 | 161 | 140 | 140 |
| 16 | −15 | 104 | 218 | 161 | 161 | 161 | 125 |
| 17 | −16 | 74 | 218 | 130 | 146 | 146 | 109 |
| 18 | −17 | 74 | 186 | 130 | 130 | 146 | 92 |
| 19 | −18 | 38 | 186 | 93 | 112 | 112 | 74 |
| 20 | −24 | 38 | 148 | 93 | 93 | 112 | 50 |
| 21 | −20 | −34 | 148 | 45 | 57 | 57 | 30 |
| 22 | −21 | −34 | 124 | 45 | 45 | 57 | 9 |
| 23 | −22 | −82 | 124 | −4 | 21 | 21 | −13 |
| 24 | −23 | −82 | 74 | −4 | −4 | 21 | −36 |
| 25 | −24 | −136 | 74 | −59 | −31 | −31 | −60 |
| 26 | −25 | −136 | 18 | −59 | −59 | −31 | −85 |
| 27 | −26 | −196 | 18 | −120 | −89 | −89 | −111 |
| 28 | −27 | −196 | −44 | −120 | −120 | −89 | −138 |

$$Y[i]_1 = \frac{Ye[i] + Yo[i+1]}{2}$$

$$Y[i]_2 = \frac{Ye[i] + Yo[i]}{2}$$

$$Y[i]_3 = \frac{Ye[i] + Yo[i-1]}{2}$$

O.I.: Ordinary integration

As clearly known from the above-mentioned explanation, a measured value processing method and a shape reconstructing method of the present invention obtain an integrated value Ye[i] up to each measured value by means of a specified process as using the even-numberth measured values in a measured value group as the respective reference values. And the methods obtain an integrated value Yo[i] up to each measured value by means of a specified process as using the odd-numberth measured values in a measured value group as the respective reference values. And the methods take an average value of said even-numberth-reference integrated value Ye(i) and one of the odd-numberth-reference integrated values Yo(i−1), Yo(i), and Yo(i+1) as a final integrated value Y(i) up to each measured value. Therefore, it is possible to reduce accumulation of integral errors without a human work such as estimation of errors, selection of integral paths, and the like Accordingly, a measured value processing and a shape reconstruction which are little influenced by single-shot noises or quantizing noises can be performed.

And a shape reconstructing apparatus of the invention can easily implement a shape reconstructing method of the invention.

What is claimed is:

1. A method for reconstructing a shape of a subject located in physical space by integrating inclinations on the subject, said method comprising:
  photographing the subject from at least two different positions to obtain two different images of the subject;
  obtaining, in pixel units, parallaxes on said subject between these positions and performing said integration as treating a pixel group having said parallaxes being within a specified range as being in one integral interval;
  obtaining an integrated value Ye(i) (even-numberth-reference integrated value) of the inclinations up to each pixel by performing processes (a) to (c) using inclinations detected at the even-numberth pixels as the respective reference inclinations;
  obtaining an integrated value Yo(i) (odd-numberth-reference integrated value) of the inclinations up to each pixel by performing processes (a) to (c) using inclinations detected at the odd-numberth pixels as the respective reference inclinations; and
  taking an average value of said even-numberth-reference integrated value Ye(i) and one of said odd-numberth-reference integrated values Yo(i−1), Yo(i), and Yo(i+1) as a final integrated result Y(i) up to each measured value, wherein;
  i is a place number in a row of pixels, and
  the processes (a) to (c) are as follows:
    (a) a process of obtaining a difference between an inclination on said reference pixel and an inclination on a pixel adjacent to it, obtaining a partial integral element by multiplying said difference by a specified factor, and accumulating said partial integral element on a partial integral element obtained before it,
    (b) a process of multiplying an inclination on said reference pixel by said specified factor, subtracting said accumulated partial integral element from this multiplied result, and taking said subtracted result as an integrated value up to said reference pixel, and
    (c) a process of obtaining integrated values up to the respective reference pixels by applying said processes (a) and (b) to the reference pixels, and complementing an integrated value up to a pixel adjacent to said reference pixel with an integrated value obtained by applying said processes (a) and (b) to said reference pixel.

2. A method for reconstructing a shape of a subject located in physical space by integrating inclinations on the subject, said method comprising:
  photographing the subject from at least two different positions to obtain two different images of the subject;
  detecting each of said inclinations in pixel units on the basis of a subject luminance ratio of pixels corresponding to the same position on the subject in the respective images obtained from said different positions;
  obtaining an integrated value Ye(i) (even-numberth-reference integrated value) of the inclinations up to each pixel by performing processes (a) to (c) using inclinations detected at the even-numberth pixels as the respective reference inclinations;
  obtaining an integrated value Yo(i) (odd-numberth-reference integrated value) of the inclinations up to each pixel by performing processes (a) to (c) using inclinations detected at the odd-numberth pixels as the respective reference inclinations; and
  taking an average value of said even-numberth-reference integrated value Ye(i) and one of said odd-numberth-reference integrated values Yo(i−1), Yo(i), and Yo(i+1) as a final integrated result Y(i) up to each measured value, wherein;
  i is a place number in a row of pixels, and
  the processes (a) to (c) are as follows:

(a) a process of obtaining a difference between an inclination on said reference pixel and an inclination on a pixel adjacent to it, obtaining a partial integral element by multiplying said difference by a specified factor, and accumulating said partial integral element on a partial integral element obtained before it, (b) a process of multiplying an inclination on said reference pixel by said specified factor, subtracting said accumulated partial integral element from this multiplied result, and taking said subtracted result as an integrated value up to said reference pixel, and (c) a process of obtaining integrated values up to the respective reference pixels by applying said processes (a) and (b) to the reference pixels, and complementing an integrated value up to a pixel adjacent to said reference pixel with an integrated value obtained by applying said processes (a) and (b) to said reference pixel.

3. A shape reconstructing apparatus for reconstructing a shape of a subject located in physical space, said shape reconstructing apparatus comprising:

means for photographing the subject from at least two different positions to obtain at lease two different images;

inclination detecting means for detecting each of the inclinations in pixel units on the basis of a subject luminance ratio or pixels corresponding to the same position on the subject in the respective images obtained from said different positions;

even-numberth-reference integrated value computing means for obtaining an integrated value Ye(i) (even-numberth-reference integrated value) of the inclinations up to each pixel by means of the following processes (a) to (c) by using inclinations on the even-numberth pixels as the respective reference inclinations;

odd-numberth-reference integrated value computing means for obtaining an integrated value Ye(i) (odd-numberth-reference integrated value) of the inclinations up to each pixel by means of the following processes (a) to (c) by using inclinations; and final integrated value computing means for taking an average value of said even-numberth-reference integrated value Ye(i) and one of the odd-numberth-reference integrated values Yo(i−1), Yo(i) and Yo(i−1) as a final integrated result Y(i) up to each measured value; wherein i is a place number in a row of pixels; and the processes (a) to (c) are as follows:

(a) a process of obtaining a difference between an inclination on said reference pixel and an inclination on a pixel adjacent to it, obtaining a partial integral element by multiplying said difference by a specified factor, and accumulating said partial integral element on a partial integral element obtained before it, (b) a process of multiplying an inclination on said reference pixel by said specified factor, subtracting said accumulated partial integral element from this multiplied result, and taking said subtracted result as an integrated value up to said reference pixel, and (c) a process of obtaining integrated values up to the respective reference pixels by applying said processes (a) and (b) to the respective reference pixels, and complementing an integrated value up to a pixel adjacent to said reference pixel with an integrated value obtained by applying said processes (a) and (b) to said reference pixel.

4. A shape reconstructing apparatus for reconstructing a shape of a subject located in physical space, said shape reconstructing apparatus comprising:

means for photographing the subject from at least two different positions to obtain at lease two different images;

means for detecting in pixel units parallaxes on said subject between these positions;

means for storing said parallaxes in pixel units;

specified parallaxes judging means for detecting a pixel group having said parallaxes being within a specified range;

even-numberth-reference integrated value computing means for obtaining an integrated value Ye(i) (even-numberth-reference integrated value) of the inclinations up to each pixel by means of the following processes (a) to (c) by using inclinations on the even-numberth pixels as the respective reference inclinations;

odd-numberth-reference integrated value computing means for obtaining an integrated value Yo(i) (odd-numberth-reference integrated value) of the inclinations up to each pixel by means of the following processes (a) to (c) by using inclinations; and final integrated value computing means for taking an average value of said even-numberth-reference integrated value Ye(i) and one of the odd-numberth-reference integrated values Yo(i−1) Yo(i), and Yo(i+1) as a final integrated result Y(i) up to each measured value; wherein i is a place number in a row of pixels; and the processes (a) to (c) are as follows:

(a) a process of obtaining a difference between an inclination on said reference pixel and an inclination on a pixel adjacent to it, obtaining a partial integral element by multiplying said difference by a specified factor, and accumulating said partial integral element on a partial integral element obtained before it, (b) a process of multiplying an inclination on said reference pixel by said specified factor, subtracting said accumulated partial integral element from this multiplied result, and taking said subtracted result as an integrated value up to said reference pixel, and (c) a process of obtaining integrated values up to the respective reference pixels by applying said processes (a) and (b) to the respective reference pixels, and complementing an integrated value up to a pixel adjacent to said reference pixel with an integrated value obtained by applying said processes (a) and (b) to said reference pixel.

5. A method for reconstructing a shape of a subject located in physical space, comprising:

(1) obtaining, multiple different images of the subject;

(2) determining inclinations, in pixel units, on the subject for each pixel of the images corresponding to a same point on the subject;

(3) repeatedly performing a first computation, including (3A) performing the first computation by computing a first integrated value Ye(i) for a first even-numbered pixel, numbered i=2 in a group of n pixels where i is a place number in a row of the pixels and n is a natural number greater than 2, by
  (a) subtracting the inclination x(i−1) of a previous pixel from the inclination x(i) of the even-numbered pixel to obtain a first inclination subtraction result,
  (b) multiplying the first inclination subtraction result by a first specified factor to obtain a first multiplication result,
  (c) accumulating successive first multiplication results to obtain a first accumulation result,
  (d) multiplying x(i) by the first specified factor to obtain a first inclination multiplication result,
  (e) subtracting the first accumulation result from the first inclination multiplication result, to obtain a first subtraction value, wherein the computed first integration result Ye(i) includes the first subtraction value, and
  (f) assigning to the odd-numbered pixel, numbered i+1, a value Ye(i+1) that is equal to the value Ye(i) for the immediately preceding even-numbered pixel, numbered i, and
(3B) successively repeating the computing a first integrated value Ye(i), for the even number values of i, i=4, 6, 8, . . . n; (4) repeatedly performing a second computation, including
(4A) performing the second computation by computing a second integrated value Yo(i) for a first odd-numbered pixel, numbered i=3 in the group of n pixels, by
  (a) subtracting the inclination x(i−1) of a previous pixel from the inclination x(i) of the odd-numbered pixel to obtain a second inclination subtraction result,
  (b) multiplying the second inclination subtraction result by a second specified factor to obtain a second multiplication result,
  (c) accumulating successive second multiplication results to obtain a second accumulation result,
  (d) multiplying x(i) by the specified second factor to obtain a second inclination multiplication result,
  (e) subtracting the second accumulation result from the second inclination multiplication result, to obtain a second subtraction value, wherein the computed second integration value Yo(i) includes the second subtraction value, and
  (f) assigning to the even-numbered pixel, numbered i+1, a value Yo(i+1) that is equal to the value Yo(i) for the immediately preceding odd-numbered pixel, numbered i, and
(4B) successively repeating the computing a second integrated value Yo(i) for the odd number values of i, i=5, 7, 9, . . . n; and (5) for each pixel number i, i=2 to n,
computing a first final integrated value, Y1(i), by averaging the values of Ye(i) and Yo(i+1),
computing a second final integrated value, Y2(i), by averaging the values of Ye(i) and Yo(1),
computing a third final integrated value, Y3(i), by averaging the values of Ye(i) and Yo(i−1), and
selecting a final integrated result, Y(i) from among Y1(i), Y2(i) and Y3(i) as an estimate of the position of a point corresponding to the pixel numbered i on the subject located in physical space.

6. The method of claim 5, wherein the value of Y(i) is selected so as to minimize effects of noise in the images on the final integrated result.

7. The method of claim 5, further comprising
judging whether, as between each successive pair of pixels numbered i−1 and i, i=3 to i, one pixel has a positive inclination and the other pixel has a negative inclination, wherein for the pairs of successive pixels that do,
  (i) the computing Ye(i) further comprises
    resetting the first specified factor for the pixel numbered i,
    clearing the first accumulation result to zero for the pixel numbered i,
    storing the value of Ye(i) for the previous pixel numbered i−1, the stored value being designatable as a basic value Ve, and
    for each of the pixels numbered from i to n, adding Ve to the first subtraction value to obtain a first addition result, wherein the computed first integrated value Ye(i) is equal to the first addition result, and
  (ii) computing Yo(i) further comprises
    resetting the second specified factor for the pixel numbered i,
    clearing the second accumulation result to zero for the pixel numbered i,
    storing the value of Yo(i) for the previous pixel numbered i−1, the stored value being designatable as a basic value Vo, and
    for each of the pixels numbered from i to n, adding Vo to the second subtraction value to obtain a second addition result, wherein the computed second integrated value Yo(i) is equal to the second addition result.

8. The method of claim 5, wherein said obtaining multiple different images includes photographing the subject from two different positions to obtain two respective images the method further comprising
obtaining in pixel units, for each pixel of the images corresponding to the same point on a subject, parallaxes on the subject between the two respective images; and
grouping in one integral interval consecutive pixels for which the obtained parallaxes are all within a specified range, wherein the group of n pixels is defined as the pixels of the same integral interval.

9. The method of claim 5, wherein said obtaining multiple different images includes photographing the subject from two different positions to obtain two respective images and said determining inclinations includes determining subject luminance ratios of pixels corresponding to the same position on the subject in the two respective images.

10. A shape reconstructing apparatus for reconstructing a shape of a subject located in physical space, comprising:
  (1) means for obtaining multiple different images of the subject;
  (2) means for determining inclinations on the subject for each corresponding pixel of the images in pixel units;
  (3) means for repeatedly performing a first computation of a first integrated value Ye(i) for each even-numbered pixel numbered i, i=2, 4 . . . n, in a group of n pixels, where i is a place number in a row of the pixels and n is a natural number greater than 2, wherein the Ye(i) computation means includes
    (a) means for subtracting the inclination x(i−1) of a previous pixel from the inclination x(i) of the even-numbered pixel to obtain a first inclination subtraction result, (b) means for multiplying the first inclination subtraction result by a first specified factor to obtain a first multiplication result, (c) means for accumulating first multiplication results to obtain a first accumulation result, (d) means for multiplying x(i) by the first specified factor to obtain a first inclination multiplication result, (e) means for subtracting the first accumulation result from the first inclination multiplication result, to obtain a first subtraction value, wherein the computed first integration value Ye(i) includes the first subtraction value, and (f) means for assigning the odd-numbered pixel numbered i+1 a value Ye(i=1) that is equal to the value Ye(i) for the immediately preceding even-numbered pixel, numbered i;

(4) means for repeatedly performing a second computation of a second integrated value Yo(i) for each odd-numbered pixel numbered i, i=3, 5 . . . n, in a group of n pixels, wherein the Yo(i) computation means includes (a) means for subtracting the inclination x(i−1) of a previous pixel from the inclination x(i) of the odd-numbered pixel to obtain a second inclination subtraction result, (b) means for multiplying the second inclination subtraction result by a second specified factor to obtain a first multiplication result, (c) means for accumulating second multiplication results to obtain a second accumulation result, (d) means for multiplying x(i) by the second specified factor to obtain a second inclination multiplication result, (e) means for subtracting the second accumulation result from the second inclination multiplication result, to obtain a second subtraction value, wherein the computed second integration value Yo(i) includes the second subtraction value, and (f) means for assigning the even-numbered pixel, numbered i+1, a value Yo(i+1) that is equal to the value Yo(i) for the immediately preceding odd-numbered pixel, numbered i; and (5) means for repeatedly performing a computation of a final integrated value, Y(i), for each pixel number i, i=2 to n, the Y(i) computation means including means for computing a first final integrated value, Y1(i), by averaging, the values of Ye(i) and Yo(i+1), means for computing a second final integrated value, Y2(i), by averaging the values of Ye(i) and Yo(i−1), means for computing a third final integrated value, Y3(i), by averaging the values of Ye(i) and Yo(i−1), and means for selecting a final integrated result, Y(i), from among Y1(i), Y2(i) and Y3(i).

11. The apparatus of claim 10, wherein the means for selecting a final integrated result includes means for determining the integrated value that minimizes the effect on the final integrated result of noise in the images.

12. The apparatus of claim 10, further comprising means for judging whether, as between each successive pair of pixels numbered i−1 and i, i=3 to n, one pixel has a positive inclination and the other pixel has a negative inclination, and wherein (i) the means for computing Ye(i) further includes means for resetting the first specified factor for the pixel numbered i, means for clearing the first accumulation result to zero for the pixel numbered i, means for storing the value of Ye(i) for the previous pixel numbered i−1 as a basic value designatable Ve, and means for adding Ve to the first subtraction value to obtain a first addition result as the computed first integrated value Ye(i), wherein the means for resetting the first specified factor, the means for clearing the first accumulation result, the means for storing the value of Ye(i), and the means for adding Ve are responsive only to a determination by the judging means that pairs of successive pixels, numbered i−1 and i, have one pixel with a negative inclination and one pixel with a positive inclination; and (ii) the means for computing Yo(i) further includes means for resetting the second specified factor for the pixel numbered i, means for clearing the second accumulation result to zero for the pixel numbered i, means for storing the value of Yo(i) for the previous pixel numbered i−1 as a basic value designatable Vo, and means for adding Vo to the second subtraction value to obtain a second addition result as the computed second integrated value Yo(i), wherein the means for resetting the second specified factor, the means for clearing the second accumulation result, the means for storing the value of Yo(i), and the means for adding Vo are responsive only to a determination by the judging means that pairs of successive pixels, numbered i−1 and i, have one pixel with a negative inclination and one pixel with a positive inclination.

13. The apparatus of claim 10, wherein said means for obtaining multiple different images includes means for photographing the subject from two different positions to obtain two respective images, the apparatus further comprising means for obtaining in pixel units, for each pixel of the images corresponding to a same point on the subject parallaxes on said subject between the two respective images; and means for grouping in one integral interval consecutive pixels for which the obtained parallaxes are all within a specified range, wherein the group of n pixels is defined as pixels that are within the same integral interval.

14. The apparatus of claim 10, wherein said means for obtaining multiple different images includes means for photographing the subject from two different positions to obtain two respective images and said means for determining inclinations includes means for determining the luminance ratio of pixels corresponding to the same position on the subject in the two respective images.

* * * * *